United States Patent
Kabbabe Malave et al.

(10) Patent No.: US 12,103,858 B2
(45) Date of Patent: Oct. 1, 2024

(54) EXTRUSION PROCESS FOR THE PREPARATION OF ALKALI METAL CARBONATE, BICARBONATE AND SESQUICARBONATE FORMULATIONS USING A DISSOLVED FUNCTIONALIZING AGENT

(71) Applicant: Solvay SA, Brussels (BE)

(72) Inventors: Jorge Alejandro Kabbabe Malave, Bourg-la-Reine (FR); Thibaud Detoisien, Dombasle-sur-Meurthe (FR); Karine Cavalier, Uccle (BE); Eric Pierre Dubois, Wasseiges (BE)

(73) Assignee: Solvay SA, Brussels (BE)

( * ) Notice: Subject to any disclaimer, the term of this patent is extended or adjusted under 35 U.S.C. 154(b) by 983 days.

(21) Appl. No.: 16/093,116

(22) PCT Filed: Apr. 13, 2017

(86) PCT No.: PCT/EP2017/059011
§ 371 (c)(1),
(2) Date: Oct. 11, 2018

(87) PCT Pub. No.: WO2017/178625
PCT Pub. Date: Oct. 19, 2017

(65) Prior Publication Data
US 2021/0214238 A1    Jul. 15, 2021

(30) Foreign Application Priority Data
Apr. 13, 2016    (EP) ..................... 16165118

(51) Int. Cl.
| | | |
|---|---|---|
| C01D 7/38 | (2006.01) |
| B01J 2/20 | (2006.01) |
| C08J 3/03 | (2006.01) |
| C08J 3/12 | (2006.01) |
| C08J 3/21 | (2006.01) |
| C08K 3/26 | (2006.01) |
| C11D 3/10 | (2006.01) |
| C11D 3/22 | (2006.01) |
| C11D 3/37 | (2006.01) |
| C11D 11/00 | (2006.01) |
| B01F 23/50 | (2022.01) |

(52) U.S. Cl.
CPC ................ *C01D 7/38* (2013.01); *B01J 2/20* (2013.01); *C08J 3/03* (2013.01); *C08J 3/12* (2013.01); *C08J 3/212* (2013.01); *C08K 3/26* (2013.01); *C11D 3/10* (2013.01); *C11D 3/222* (2013.01); *C11D 3/37* (2013.01); *C11D 11/00* (2013.01); *B01F 23/56* (2022.01); *C01P 2004/54* (2013.01); *C01P 2004/61* (2013.01); *C01P 2006/90* (2013.01); *C08J 2329/04* (2013.01); *C08J 2389/00* (2013.01); *C08K 2003/262* (2013.01)

(58) Field of Classification Search
CPC ...... C08K 3/26; C08K 2003/262; C11D 3/10; C01D 7/38; C08J 3/12; C01P 2004/60; B01J 2/20
See application file for complete search history.

(56) References Cited

U.S. PATENT DOCUMENTS

| | | | |
|---|---|---|---|
| 5,411,750 A | 5/1995 | Lajoie et al. |
| 6,034,050 A | 3/2000 | Artiga Gonzalez et al. |
| 6,673,765 B1 | 1/2004 | Schulz et al. |
| 2008/0287339 A1* | 11/2008 | Gould | C11D 3/3761 510/451 |
| 2015/0132832 A1* | 5/2015 | Chan | C11D 3/3719 510/392 |
| 2015/0252295 A1* | 9/2015 | Roerdink Lander | C11D 3/3757 510/451 |

FOREIGN PATENT DOCUMENTS

| | | |
|---|---|---|
| CN | 104393077 A | 3/2015 |
| DE | 102004019996 A1 * | 4/2004 |
| EP | 1170256 A2 | 1/2002 |
| GB | 423592 A | 7/1933 |
| WO | WO 2014/096457 A1 | 6/2014 |
| WO | WO 2017/178623 A1 | 10/2017 |

OTHER PUBLICATIONS

Machine translation into English of DE-102004019996-A1; Birgit et al; Apr. 2004 (Year: 2004).*
U.S. Appl. No. 16/093,114 filed Oct. 11, 2018, Jorge Alejandro Kabbabe Malave et al.

* cited by examiner

*Primary Examiner* — Karuna P Reddy
(74) *Attorney, Agent, or Firm* — Osha Bergman Watanabe & Burton LLP

(57) ABSTRACT

A process for preparing a formulation comprising an alkali metal salt selected from the group consisting of alkali metal bicarbonate salts, alkali metal carbonate salts, alkali metal sesquicarbonate salts and combinations thereof, wherein said process includes: (a) dissolving a functionalizing agent in a solvent; (b) mixing the alkali metal salt with the solution comprising the functionalizing agent that a paste-like composition is formed; (c) extruding the paste-like composition to obtain filaments or granules; (d) at least partially removing the solvent from the filaments or granules. A powder, filaments and granules are obtainable from said process and may be used in various applications such as in plastic foaming or in food and feed leavening compositions.

6 Claims, No Drawings

EXTRUSION PROCESS FOR THE PREPARATION OF ALKALI METAL CARBONATE, BICARBONATE AND SESQUICARBONATE FORMULATIONS USING A DISSOLVED FUNCTIONALIZING AGENT

CROSS-REFERENCE TO RELATED APPLICATIONS

The present application is a U.S. national stage entry under 35 U.S.C. § 371 of International Application No. PCT/EP2017/059011 filed Apr. 13, 2017, which claims priority benefit to European Application No. 16165118.7 filed on Apr. 13, 2016, the whole content of this application being incorporated herein by reference for all purposes.

FIELD OF THE INVENTION

The invention relates to a process for preparing a formulation comprising an alkali metal salt selected from alkali metal bicarbonate salts, alkali metal carbonate salts, alkali metal sesquicarbonate salts and combinations thereof by extrusion of a paste-like composition which is obtained by dissolving a functionalizing agent in a solvent and mixing this solution comprising the functionalizing agent with the alkali metal salt. The invention further relates to an alkali metal salt formulation as granules or filaments, or in the form of a powder comprising the alkali metal salt obtainable from said process and to the use of this formulation e.g., in food leavening compositions and as foaming agents for plastics.

PRIOR ART

Alkali metal bicarbonate particles, such as sodium bicarbonate particles and potassium bicarbonate particles, are known in the art. These products have many properties which make them interesting and extensively used in several technical fields, such as pharmaceutical industry, the feed and food industry, and the cosmetic industry.

The most common way to manufacture bicarbonate particles is crystallization by carbonization with carbon dioxide of a solution or suspension of the corresponding alkali metal (sodium or potassium carbonate for example) or a solution or suspension of the hydroxide of the corresponding alkali metal. It is also common to crystallize bicarbonates by controlled cooling of bicarbonate solutions or suspensions, or by evaporating the solvent of such solutions or suspensions.

For the industrial use of alkali metal bicarbonate particles control of specific properties of the particles is required, such as: decomposition temperature, or their dissolution time.

Methods to control some parameters of alkali metal bicarbonate particles, such as a bulk density are known in the art. E.g. U.S. Pat. No. 5,411,750 discloses a method of producing sodium bicarbonate powder with a bulk density between 70 and 500 kg/m$^3$. The particles are prepared by spray-drying a dilute aqueous solution or suspension of the bicarbonate with an alkali metal salt as additive. WO 2014/096457 discloses a method for producing sodium bicarbonate particles by spray-drying of an aqueous solution comprising 1-10% by weight of sodium bicarbonate in an additive selected from the group consisting of magnesium salt, sodium alkyl benzene sulfonat and soybean lecithin.

The alkali metal bicarbonate particles produced by spray-drying are generally fine particles. Accordingly, in order to modify the shape of the particles, different unit operations need to be performed such as crystallization processes, grinding processes, drying processes and/or sieving processes. These procedural steps are expensive, time consuming and may not be suitable to produce specific particle shapes that are required for specific applications of the alkali metal bicarbonate.

In CN 104393077 A, a coating for a solar cell is disclosed, which is obtained by melting, extruding, granulating a composition comprising silicone, sodium bicarbonate, 3-chloropropyl-alkyne, urethane acrylate, a stabilizer and a surfactant, followed by the addition of further sodium bicarbonate. The concentration of sodium bicarbonate in the coating, as disclosed in the examples of CN 104393077 A, ranges from 9.6 to 12.3% by weight. However, this process appears to use sodium bicarbonate as a source for $Na_2O$, since melting is carried out at high temperatures, between 600 to 800° C., thereby releasing $CO_2$ under formation of $Na_2O$, making it necessary to add further sodium bicarbonate after the extrusion has been carried out.

In view of the above, there is still a need for a process for the preparation of an alkali metal carbonate, bicarbonate and sesquicarbonate formulations, which can easily be modified in terms of their shape and size, also enabling the adjustment of the porosity and the bulk density of the formulation. At the same time, it would be desirable if the formulation obtained from said process showed advantageous properties such as increased dissolution times and $CO_2$ release temperatures of generally more than 80°C and preferably less than 400° C., and a chemical reactivity that can be adjusted with respect to the desired application.

BRIEF SUMMARY OF THE INVENTION

It has been surprisingly found that an alkali metal salt selected from alkali metal bicarbonate salts, alkali metal carbonate salts, alkali metal sesquicarbonate salts and combinations thereof can be provided in a paste-like composition suitable for extrusion by admixing the alkali metal salt with a functionalizing agent which is dissolved in a solvent. By means of extrusion, the resulting paste-like composition can easily be modified with respect to its shape and size, porosity and bulk density to give an alkali metal salt formulation in the form of filaments or granules which shows excellent duration of dissolution and excellent $CO_2$ release properties can be obtained thereof by means of extruding the paste-like composition. The extrusion process of the present invention can also directly provide the alkali metal formulation in form of a powder, which also shows excellent duration of dissolution and excellent $CO_2$ release properties, or the filaments and granules can be further milled in order to obtain a powder. The chemical reactivity of the alkali metal salt formulation can be adjusted by means of selection of the functionalizing agent.

In view of the above, the present invention relates to:

Item 1. A process for preparing a formulation comprising an alkali metal salt selected from the group consisting of alkali metal bicarbonate salts, alkali metal carbonate salts, alkali metal sesquicarbonate salts and combinations thereof, wherein said process comprises:
  (a) dissolving a functionalizing agent in a solvent to obtain a solution comprising the functionalizing agent;
  (b) mixing the alkali metal salt with the solution comprising the functionalizing agent in a weight ratio so that a paste-like composition comprising the alkali metal salt and the functionalizing agent is formed;

(c) extruding the paste-like composition to obtain a powder, filaments or granules comprising the solvent, the alkali metal salt and the functionalizing agent;

(d) at least partially removing the solvent from the powder, filaments or granules to obtain filaments or granules comprising the alkali metal salt and the functionalizing agent.

Item 2. The process of item 1, wherein the functionalizing agent is a polymer selected from the group consisting of polyvinylalcohol (PVOH), a polyglycol, polyethylene glycol (PEG), a polysaccharide, polyacrylic acid (PAA), poly(acrylic acid-co-maleic acid), polyethylenimine, polyvinylpyrrolidone (PVP), N-(2-Hydroxypropyl) methacrylamide (HPMA), poly-galactomannane, and combinations thereof.

Item 3. The process of item 2, wherein the polysaccharide is selected from the group consisting of hydrolyzed starch, carboxymethylcellulose (CMC), arabic gum, carrageenan, guar gum, locust bean gum, xanthan gum, and combinations thereof.

Item 4. The process of item 1, wherein the functionalizing agent is an amino-acid.

Item 5. The process of item 4, wherein the amino acid is selected from the group consisting of casein, gelatin, glycine, proline, hydroxyproline, glutamic acid, alanine, arginine, aspartic acid, lysine, pectin, serine, leucine, valine, phenylalanine, threonine, isoleucine, hydroxylysine, methionine, histidine, tyrosine, and combinations thereof.

Item 6. The process of item 1, wherein the functionalizing agent is a water-soluble inorganic salt with the proviso that the water-soluble inorganic salt is not sodium silicate.

Item 7. The process of item 6, wherein the water-soluble inorganic salt is selected from the group consisting of silicates (excluding sodium silicate), NaCl, KCl, $MgCl_2$, sodium phosphate, borates, nitrates, nitrites, sulfates, sulfites and combinations thereof.

Item 8. The process of any one of items 1 to 7, wherein the alkali metal salt is a bicarbonate or a sesquicarbonate salt, in particular sodium bicarbonate or sodium sesquicarbonate.

Item 9. The process of any one of items 1 to 8, wherein the alkali metal salt used at step (b) is made of particles, and the medium particle size (D50 in weight) of said particles is 10-300 µm, preferably 20-200 µm, more preferably 30-150 µm, more preferably 40-130 µm.

Item 10. The process of any one of items 1 to 9, wherein the solvent is water.

Item 11. The process of item 10, wherein the solution comprising the functionalizing agent at step a) comprises at least 5 g, preferably at least 10, more preferably at least 20 g of the functionalizing agent per 100 g of water.

Item 12. The process of item 10 or 11, wherein the solution comprising the functionalizing agent at step a) comprises at most 100 g, preferably at most 50 g, more preferably at most 40 g of the functionalizing agent per 100 g of water.

Item 13. The process according to item 12 wherein the functionalizing agent is PVOH, and the solution comprising the functionalizing agent at step a) comprises 20 to 40 g of PVOH per 100 g of water, and the mixing of the alkali metal salt particles with the solution of PVOH at step b) is at a weight ratio of at least 1/1 to at most 3/1 of alkali metal salt particles to the solution comprising the functionalizing agent.

Item 14. The process of any one of the preceding items, wherein at step (b), a third compound selected among a mineral compound, an organic compound, and mixtures thereof,
is added to the alkali metal salt or to the solution comprising the functionalizing agent to obtain the paste-like composition.

Item 15. The process of item 14, wherein the mineral compound is silica, zeolite, calcium carbonate, and/or wherein the organic compound is citric acid.

Item 16. The process of any one of item 1 to 16, wherein the extrusion is performed on a screw extruder, or a twin screw extruder.

Item 17. The process of any one of the preceding items, wherein the alkali metal salt or the particles is (are) encapsulated by the functionalizing agent.

Item 18. Granules or filaments or a powder comprising a functionalizing agent and an alkali metal salt selected from the group consisting of alkali metal bicarbonate salts, alkali metal carbonate salts, alkali metal sesquicarbonate salts and combinations thereof, obtainable by the process of any one of items 1 to 17.

Item 19. Granules, filaments or a powder comprising a functionalizing agent and an alkali metal salt selected from the group consisting of alkali metal bicarbonate salts, alkali metal carbonate salts, alkali metal sesquicarbonate salts and combinations thereof, or the granules or filaments or the powder according to item 18, comprising: at least 40%, preferably at least 75%, more preferably at least 85% by weight of the alkali metal salt, and 0.1% to 60% by weight of the functionalizing agent, and at most 49.9%, preferably at most 24.9%, more preferably at most 14.9% by weight of water.

Item 20. The granules or filaments or the powder of item 19 comprising at least 50%, preferably at least 60%, more preferably at least 65%, even more preferably at least 70%, even more preferably at least 75%, even more preferably at least 80%, even more preferably at least 85% by weight of the alkali metal salt.

Item 21. The granules or filaments of any one of items 18 to 20 having a diameter of 100 µm to 100 mm, preferably of 200 µm to 50 mm, more preferably 500 µm to 5 mm, or of 1 mm to 2 mm.

Item 22. The granules or filaments of any one of items 18 to 21, having a length to diameter ratio of at least 0.4 and preferably of at most 4.

Item 23. The granules or filaments or the powder of any one of items 18 to 22 comprising at least 40% by weight of alkali metal bicarbonate, at least 5% and at most 55% by weight of PVOH, and at most 55% by weight of water.

Item 24. The granules or filaments or the powder of any one of items 18 to 23, wherein the alkali metal salt in the formulation shows a dissolution time of at least 100 seconds.

Item 25. The granules or filaments or the powder of any one of items 18 to 24, wherein the alkali metal salt is a bicarbonate or a sesquicarbonate salt and wherein the formulation shows a $CO_2$ release maximum temperature of at least 150° C., as determined by thermogravimetric analysis (TGA).

Item 26. The granules or filaments or the powder of any one of items 18 to 25, wherein the alkali metal salt or the particles is (are) encapsulated by the functionalizing agent.

Item 27. Use of the granules and filaments of any one of items 18 to 26 in plastic processing, plastic foaming, flue gas cleaning, pharmaceutical or cosmetics compositions, detergency compositions, food and feed leavening compositions, food and feed supplement additive or food and feed pH buffer in particular for aquatic animal or for fish.

Item 28. A method for making products in one or more applications, such as plastic industry, flue gas cleaning, pharmaceutical industry, cosmetics industry, detergence industry, food and feed industry, the method comprising using the granules or filaments of any one of items 18 to 26 as a flue gas cleaning agent, or as an ingredient in plastic compositions, in pharmaceutical compositions, in cosmetics compositions, in detergents, in food and feed leavening compositions, as a food and feed supplement additive or food and feed pH buffer in particular for aquatic animal or for fish.

Definitions

In the present description, wherein an element or composition is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components.

Further, it should be understood that elements and/or features of an apparatus, a process or method described herein can be combined in a variety of ways without departing from the scope and disclosures of the present teachings, whether explicit or implicit herein.

The term "alkali metal salt", as used herein, refers to alkali metal bicarbonate salts, alkali metal carbonate salts, alkali metal sesquicarbonate salts and combinations thereof.

The term "extrusion" or "extruding", as used herein, refers to a process in which a softened material, herein a paste-like composition as defined below, is forced through a shaped device, e.g. a syringe, in order to obtain a material in form of a powder, or of a certain shape, e.g. filaments or granules. The filaments or granules obtained from the extrusion process can be further milled in one embodiment of the present invention. The extrusion process can also be carried out by means of a continuous mixing/extrusion process, wherein the material is mixed and extruded in a low pressure, temperature-controlled, paddle-equipped twin screw instrument. A liquid or a melted additive can be sprayed on the material at any point during the process. The temperature applied in the continuous mixing/extrusion process can be in the range of −20 to 300° C. The residence time can be in the range from 2 to 20 minutes. The rotary speed of the shafts in the paddle-equipped twin screw instrument can be in the range of from 30 to 160 rpm.

Suitable continuous mixing/extrusion processors include processors, which allow mixing, kneading and extruding a homogenous mix of high-viscosity materials. Preferred continuous mixing/extrusion processors include twin screws and paddles that allow thorough and complete mixing, with co-rotating shafts and close clearances between the paddles as well as between the paddles and the barrel walls allowing for uniform mixing, performed in less time than with conventional mixers. Further preferred continuous processors allow high-volume applications with a capacity of from 1 kg to 10 tons per hour.

The term "functionalizing agent", as used herein, refers to a compound that is capable of improving at least one $CO_2$ release property of sodium bicarbonate when formulated with the sodium bicarbonate, relative to the sodium bicarbonate alone. For example, the functionalizing agent is capable of increasing the $CO_2$ release beginning temperature and/or the $CO_2$ release maximum temperature, determined in accordance with Example 3 and the present application. Preferably, the functionalizing agent is a compound as defined in items 2, 4, and 6 described above.

A "paste-like composition", as referred to herein, is a composition comprising the alkali metal salt and the functionalizing agent, wherein the paste-like composition is suitable for being used in an extrusion process. Preferably, the paste-like composition is a paste or a gel. A "paste" or "gel" is a semi-solid suspension, which is mouldable if external forces are applied, e.g. external forces that occur during an extrusion process, but keeps its shape in the absence of external forces. The viscosity of the paste-like composition is preferably within a range of 5000 to 25000 mPa·s, more preferably 10000 to 20000 mPa·s as determined by rheological analysis at room temperature (25° C.) and a shear rate of 100 $s^{-1}$. The rheological analysis of the paste-like composition can be carried out using a rotational rheometer (e.g. "RheolabQC" from Anton PAAR).

The term "comprising" includes "consisting essentially of" and "consisting of".

The sign "%" refers to "weight percent" unless specifically stated otherwise.

The term "polymer" refers to natural and synthetic macromolecules that are composed of repeated subunits.

As used herein "bulk density" refers to loose bulk density and can be determined according to ASTM D7481-09 "method A" unless specifically stated otherwise. Tapped density can also be determined according to ASTM D7481-09 "method A" unless specifically stated otherwise.

As used herein "dissolution time" is measured with a conductivity meter diving cell in a beaker stirred with 1 liter (1000 ml±1 g) deionized water at 25° C.±0.5° C. The stirring speed is 350 rpm, the geometry of the stirrer (4 vertical blades) is: height 11 mm, diameter 42 mm. Each blade measures 20 mm in length and 10 mm in height. The beaker has a diameter of 100 mm. The gap between the blades and the bottom of the beaker is 10 mm. The conductivity meter is positioned at 40 mm of the stirrer axis and 20 mm under the liquid surface. A 10 g±0.05 g sample of the alkali metal bicarbonate formulation is introduced into the solution or suspension. Upon dissolution, the conductivity of the solution or suspension increases. The "dissolution time" is the time (starting with introduction of the formulation sample into the solution) required to reach 95% of the maximum value of the conductivity during dissolution of the formulation sample.

The phrase 'A and/or B' refers to the following selections: element A; or element B; or combination of elements A and B (A+B). The phrase 'A and/or B' is equivalent to at least one of A and B. The phrase 'A and/or B' equates to at least one of A and B.

In the present specification, the description of a range of values for a variable, defined by a bottom limit, or a top limit, or by a bottom limit and a top limit, also comprises the embodiments in which the variable is chosen, respectively, within the value range: excluding the bottom limit, or excluding the top limit, or excluding the bottom limit and the top limit.

In the present specification, the description of several successive ranges of values for the same variable also comprises the description of embodiments where the variable is chosen in any other intermediate range included in the successive ranges. Thus, for illustration purpose, when it is stated that "the element X is generally at least 10, advantageously at least 15", the present description also includes another embodiment where a new minimum can be selected between 10 and 15, for example: where "the element X is at least 11", or also where: "the element X is at least 13.74", etc.; 11 or 13.74 being values included between 10 and 15. Also for illustration purpose, when it is indicated that "the element X is generally at most 15, advantageously at most 10", the present description also includes another embodiment where a new maximum can be selected between 10 and 15.

In the present specification, when in an embodiment the choice of an element from a group of elements is described, the following embodiments are also explicitly described:
- the choice of two or more elements from the group,
- the choice of an element from a subgroup of elements consisting of the group of elements from which one or more elements have been removed.

The $CO_2$ release properties of the alkali metal bicarbonate formulation of the present invention can be determined by performing a thermogravimetric analysis (TGA) of a sample of the alkali metal bicarbonate formulation, measuring the weight loss of the sample in dependence of the temperature. The $CO_2$ release properties are characterized by the derivate value for weight loss depending on the temperature. The $CO_2$ release beginning temperature is the temperature where the derivate value for weight loss starts to raise. The $CO_2$ release maximum temperature is the temperature where the derivate value for weight loss is at maximum. Typically, heating is performed between 30° C. and 500° C. at a speed of 10° C./min on a sample of 15 mg of the formulation.

Thermogravimetric analysis can e.g. be performed on an STD Q600 V20.9 Build 20 thermogravimetric analysis instrument (provided by TA Instruments).

DETAILED DESCRIPTION OF THE INVENTION

As mentioned above, the present invention relates to a process for preparing a formulation comprising an alkali metal salt selected from the group consisting of alkali metal bicarbonate salts, alkali metal carbonate salts, alkali metal sesquicarbonate salts and combinations thereof, wherein said process comprises:
(a) dissolving a functionalizing agent in a solvent to obtain a solution comprising the functionalizing agent;
(b) mixing the alkali metal salt with the solution comprising the functionalizing agent in a weight ratio so that a paste-like composition comprising the alkali metal salt and the functionalizing agent is formed;
(c) extruding the paste-like composition to obtain a powder, filaments or granules comprising the solvent, the alkali metal salt and the functionalizing agent;
(d) at least partially removing the solvent from the powder, filaments or granules to obtain filaments or granules comprising the alkali metal salt and the functionalizing agent.

In a preferred embodiment of the present invention, the functionalizing agent is a polymer selected from the group consisting of polyvinylalcohol (PVOH), a polyglycol, polyethylene glycol (PEG), a polysaccharide, polyacrylic acid (PAA), poly(acrylic acid-co-maleic acid), polyethylenimine, polyvinylpyrrolidone (PVP), N-(2-Hydroxypropyl) methacrylamide (HPMA), poly-galactomannane, and combinations thereof.

The polysaccharide is preferably selected from the group consisting of hydrolyzed starch, carboxymethylcellulose (CMC), arabic gum, carrageenan, guar gum, locust bean gum, xanthan gum (such as e.g., rhodopol), and combinations thereof.

A particularly preferred functionalizing agent is polyvinylalcohol (PVOH).

In a further preferred embodiment of the present invention, the functionalizing agent is a resin acid. The resin acid is preferably a tricyclic diterpene carboxylic acid, preferably belonging to the abietane diterpene group.

In a further preferred embodiment of the invention, the functionalizing agent is an amino-acid. Preferably, the amino acid is selected from the group consisting of selected from the group consisting of casein, gelatin, glycine, proline, hydroxyproline, glutamic acid, alanine, arginine, aspartic acid, lysine, pectin, serine, leucine, valine, phenylalanine, threonine, isoleucine, hydroxylysine, methionine, histidine, tyrosine, and combinations thereof.

The functionalizing agent can also be a water-soluble inorganic salt with the proviso that the water-soluble salt is not sodium silicate. Preferably, the water-soluble inorganic salt is selected from the group consisting of silicates (excluding sodium silicate), NaCl, KCl, $MgCl_2$, sodium phosphate, borates, nitrates, nitrites, sulfates, sulfites and combinations thereof.

Preferably, the paste-like composition undergoing extrusion comprises 0.1% to 60%, preferably 0.5% to 55%, more preferably 1.0% to 50%, even more preferably 2.0% to 45% by weight of the functionalizing agent. If present in an amount of less than 0.1% by weight, the functionalizing agent is less efficient in terms of the provision of a paste-like composition. More than 60% by weight of the functionalizing agent are disadvantageous for cost reasons.

Preferably, the paste-like composition undergoing extrusion comprises at least 40%, more preferably at least 50%, even more preferably at least 60%, even more preferably at least 65%, even more preferably at least 70%, even more preferably at least 75%, even more preferably at least 80%, and even more preferably at least 85% by weight of the alkali metal salt.

The alkali metal salt is preferably a bicarbonate or a sesquicarbonate salt, in particular sodium bicarbonate or sodium sesquicarbonate. Particularly preferred is sodium bicarbonate.

The alkali metal salt particles preferably have a medium particle size (D50 in weight) of less than 300 μm, preferably less than 200 μm, more preferably less than 130 μm. The particles typically have a medium particle size (D50 in weight) of at least 10 μm, or at least 20 μm, or at least 30 μm, or at least 40 μm, or at least 50 μm. The medium particle size (D50 in weight) of the particles may range from 10-300 μm, or 20-200 μm, or 30-150 μm, or 50-130 μm. The particle size distribution can be determined according to ISO 13320. For example, the weight-average diameter D50 value can be measured by laser diffraction and scattering on a Malvern Mastersizer S particle size analyser using an He—Ne laser source having a wavelength of 632.8 nm and a diameter of 18 mm, a measurement cell equipped with a backscatter 300 mm lens (300 RF), and MS 17 liquid preparation unit, and an automatic solvent filtration kit ("ethanol kit") using ethanol saturated with the alkali metal salt (wet method).

The solvent of the process of the present invention is selected from the group consisting of methanol, ethanol and water. Preferably, the solvent is water.

In a preferred embodiment of the invention, the solution comprising the functionalizing agent at step a) comprises at least 5 g, more preferably at least 10 g, even more preferably at least 20 g of the functionalizing agent per 100 g of water.

In a further preferred embodiment of the process of the present invention, the solution comprising the functionalizing agent at step a) comprises at most 100 g, more preferably at most 50 g, even more preferably at most 40 g of the functionalizing agent per 100 g of water.

Preferably, the weight ratio of alkali metal salt particles to the solution comprising the functionalizing agent is at least 1/3 to at most 4/1, more preferably at least 1/1 to at most 4/1, even more preferably 1/1 to at most 3/1.

In a particularly preferred process of the present invention, the functionalizing agent is PVOH, and the solution comprising the functionalizing agent at step a) comprises 20 to 40 g of PVOH per 100 g of water, and the mixing of the alkali metal salt particles with the solution of PVOH at step b) is at a weight ratio of at least 1/1 to at most 3/1 of alkali metal salt particles to the solution comprising the functionalizing agent. If functionalizing agent, water and alkali metal salts are used in these amounts and ratios, a paste-like composition is obtained that shows excellent homogeneity.

Preferably, at step (b), a third compound selected among a mineral compound, an organic compound, and mixtures thereof, is added to the alkali metal salt or to the solution comprising the functionalizing agent to obtain the paste-like composition.

The mineral compound is preferably silica, zeolite, calcium carbonate, and/or the organic compound is preferably citric acid.

In the process for preparing an alkali metal bicarbonate formulation by extrusion, all suitable extrusion procedures as known in the art can be used.

The extrusion step (c) of the present invention is preferably performed on a screw extruder, or a twin screw extruder.

After extrusion, the solvent is at least partially removed from the powder, filaments or granules obtained from the extrusion process. The removal of the solvent is preferably performed at a temperature higher than 50° C.

The process of the present invention allows the control of the shape and size of the resulting formulation, which can be obtained as a powder, or as filaments or granules as described above. The ability to control shape and size of the alkali metal bicarbonate formulation of the present invention is advantageous with respect to the various applications of alkali metal bicarbonates as known in the art. Preferably, the granules or filaments obtained by the process of the present invention have a diameter of 100 µm to 100 mm, more preferably of 200 µm to 50 mm, even more preferably 500 µm to 5 mm, or of 1 mm to 2 mm.

Powders obtained from the extrusion process or by further milling the filaments or granules obtained from the extrusion process comprise particles with a medium particle size (D50 in weight) in the range of 1 µm to 2 mm, preferably of 10 µm to 500 µm. The particle size distribution can be determined according to ISO 13320.

The present invention furthermore relates to a powder, granules or filaments comprising a functionalizing agent and an alkali metal salt selected from the group consisting of alkali metal bicarbonate salts, alkali metal carbonate salts, alkali metal sesquicarbonate salts and combinations thereof, preferably obtainable by the process as described above.

Preferably, the powder, granules or filaments comprise at least 40%, more preferably at least 50%, even more preferably at least 60%, even more preferably at least 65%, even more preferably at least 70%, even more preferably at least 75%, even more preferably at least 80%, and even more preferably at least 85% by weight of the alkali metal salt, and 0.1% to 60%, preferably 0.5% to 55%, more preferably 1.0% to 50%, even more preferably 2.0% to 45% by weight of the functionalizing agent, and at most 49.9%, preferably at most 24.9%, more preferably at most 14.9% by weight of water.

Preferably, the granules or filaments of the present invention have a diameter of 100 µm to 100 mm, more preferably of 200 µm to 50 mm, even more preferably 500 µm to 5 mm, or of 1 mm to 2 mm. The length-to-diameter ratio of the filaments or granules may range from about 0.4 to about 4.

Preferably, the powder, granules or filaments of the present invention comprise at least 40% by weight of alkali metal bicarbonate, at least 5% and at most 55% by weight of PVOH, and at most 55% by weight of water.

Preferably, the alkali metal salt is a bicarbonate or a sesquicarbonate salt, particularly a sodium bicarbonate or sodium sesquicarbonate. Particularly preferred is sodium bicarbonate.

The powder, granules or filaments obtainable by the process of the invention show an excellently increased dissolution time. The powder, granules or filaments of the present invention show a dissolution time of at least 30 seconds, preferably at least 100 seconds, more preferably at least 200 seconds.

The powder, granules or filaments obtainable from the processes of the invention also show excellent $CO_2$ release properties. $CO_2$ release of the formulation obtained from the process of the present invention begins at a temperature of at least 120° C., preferably at a temperature of at least 125° C., more preferably at a temperature of at least 130° C., even more preferably at a temperature of at least 135° C., and particularly preferably at a temperature of at least 140° C., as determined by the TGA method described above. The $CO_2$ release typically has its maximum at a temperature of at least 150° C., preferably at a temperature of at least 155° C., more preferably at a temperature of at least 160° C., even more preferably at a temperature of at least 165° C., and particularly preferably at a temperature of at least 170° C., as determined by the TGA method described above.

These advantageous properties of the formulation as described above and as obtainable by the process of the invention make it possible to envisage various applications for this alkali metal bicarbonate formulation. The present invention therefore further relates to the use of the powder, granules and filaments as described above, in plastic processing, plastic foaming, flue gas cleaning, pharmaceutical or cosmetics compositions, detergency compositions, food and feed leavening compositions, food and feed supplement additive or food and feed pH buffer in particular for aquatic animal or for fish.

The following examples are given by way of non-limiting illustration of the present invention, and variations thereof that are readily accessible to a person skilled in the art.

EXAMPLES

Example 1: Determination of the Optimal Ratio of Functionalizing Agent, Water and Alkali Metal Salt Polyvinylalcohol (KURARAY, Poval 4-88) was mixed with water at room temperature (20 to 30° C.) and stirred for 2 h. Sodium bicarbonate (SOLVAY BICAR® TEC 0/13) was added to the polyvinylalcohol solution while continuing stirring for another 10 minutes. The homogeneity of the resulting paste-like compositions was determined as indicated in Table 1 below. "+" means excellent homogeneity, "−" means acceptable homogeneity.

TABLE 1

| Entry | PVOH [%] | Water [%] | Sodium Bicarbonate [%] | Homogeneity of the composition |
|---|---|---|---|---|
| 1 | 5 | 20 | 75 | + |
| 2 | 5 | 45 | 50 | − |
| 3 | 10 | 40 | 50 | + |
| 4 | 10 | 65 | 25 | − |

The compositions obtained in entries 1 and 3 were paste-like and showed excellent homogeneity. The polyvinylalkohol concentration in both formulations was 25 g per 100 g water, and the ratio of PVOH solution and sodium bicarbonate was 1/3 (entry 1) and 1/1 (entry 3), respectively.

Example 2: Flow Resistance and Friability of Extrusion Products

Polyvinylalcohol (KURARAY, Poval 4-88) was mixed with water at room temperature (20 to 30)° C. and stirred for 2 h. Different amounts of sodium bicarbonate were added to the polyvinylalcohol solution while stirring for another 10 minutes to obtain three paste compositions (compositions 1 to 3). The composition of compositions 1 to 3 is shown in the following Table 2.

TABLE 2

| Composition | Water [g] | PVOH [g] | Bicarbonate [g] | PVOH [%] | Bicarbonate [%] |
|---|---|---|---|---|---|
| 1 | 40 | 10 | 100 | 6.67 | 66.67 |
| 2 | 40 | 10 | 150 | 5.00 | 75.00 |
| 3 | 40 | 10 | 200 | 4.00 | 80.00 |

Compositions 1 to 3 were submitted to extrusion using a syringe. The extrusion products were investigated with respect to their flow resistance and friability. The results are shown in the following Table 3, wherein "++" means excellent. "+" means very good, "−" means acceptable.

TABLE 3

| Composition | Flow resistance | Friability |
|---|---|---|
| 1 | − | − |
| 2 | + | + |
| 3 | ++ | ++ |

Extrusion products with very good and excellent flow resistance and friability were particularly obtained with compositions 2 and 3 wherein the amount of bicarbonate was 75% and 80% by weight, respectively.

Example 3: Dissolution Time and $CO_2$ Release of Extrusion Products 10 g polyvinylalcohol (KURARAY, Poval 4-88) were dissolved in 40 ml of water at room temperature (20 to 30)° C. while stirring for 2 h until complete dissolution of the polyvinylalcohol was achieved. 200 g of sodium bicarbonate were mixed with the resulting solution, and stirring was continued for 10 minutes, resulting in the formation of a homogenous paste-like composition comprising the sodium bicarbonate and the polyvinylalkohol.

The paste-like composition was submitted to extrusion using a syringe resulting in the formation of filaments 2 mm in diameter that where cut at about 3 to 5 mm in length. Water was subsequently removed from the filaments at a temperature of 60° C.

Dissolution time and $CO_2$ release temperature of the formulation was determined as described above. The results are given in the following Table 4.

TABLE 4

| Functionalizing agent | Concentration [g of functionalizing agent on kg formulation] | Dissolution Time [s] | TGA $CO_2$ release beginning temperature [° C.] | TGA $CO_2$ release maximum temperature [° C.] |
|---|---|---|---|---|
| Polyvinyl alcohol | 60 | 203.0 | 143.1 | 174.8 |

TGA method: 35 to 250° C./ 10° C./min

The result obtained in Example 3 shows that dissolution times of more than 200 seconds can be achieved when polyvinylalcohol is used as the functionalizing agent in the extrusion process of the present invention.

The $CO_2$ release begins at a temperature of approximately 143° C., and has its maximum at approximately 175° C.

Example 4: Decomposition Kinetics

The following Table 5a shows five sodium bicarbonate products (entries 1 to 5) comprising different functionalizing agents that were obtained by the extrusion process according to the invention.

The sodium bicarbonate products according to entries 1 and 2 of Table 5a were obtained by means of extrusion using a syringe. The procedure followed was similar to the procedure described under Example 2, using polyvinylalcohol (PVOH) (entry 1) and rhodopol (entry 2) in the amounts indicated in entries 1 and 2 of Table 5a (based on 200 g of sodium bicarbonate) as the functionalizing agents.

The sodium bicarbonate product according to entry 3 of Table 5a was obtained by means of a continuous mixing/ extrusion process. Mass flow amounts of bicarbonate were between 10 and 30 kg/h. Functionalizing agents were added as indicated in the Table 5a (entries 3 10). The temperature applied in the process was between 30 and 100° C. The residence time was between 2 to 20 minutes.

The sodium bicarbonate product according to entry 4 of Table 5a was obtained by means of a continuous mixing/ extrusion process, which was carried out as described for the product according to entry 3, using PEG4000 as the functionalizing agent. The resulting product was subsequently milled using a Planetary ball mill providing the product according to entry 4 of Table 5a.

The reference product is SOLVAY BICAR® TEC 0/13 (Table 5, entry 5).

TABLE 5a

| Entry | Process | Functionalizing Agent (FA) | [wt. %] |
|---|---|---|---|
| 1 | Extrusion (syringe) | Polyvinylalcohol | 10 |
| 2 | Extrusion (syringe) | Rhodopol (Xanthan gum family) | 0.6 |
| 3 | Extrusion (continuous mixing/extrusion) | Polyvinylalkohol | 5 |
| 4 | Extrusion + Milling | PEG4000 | 10 |
| 5 | BICAR® | − | − |

Decomposition kinetics of the sodium bicarbonate products indicated in Table 5a were measured by means of a thermal balance analyzer (Moisture Analyzer Mettler Toledo HX204). 2 to 3 g of the product was uniformly spread on an aluminum pan, and put in the moisture analyzer, which was rapidly heated to the desired temperature of 140° C.

t95% [s] is the decomposition time at a temperature T (i.e. 140)° C. where 95% of the final loss is reached at the desired temperature; a [% wt/s] is the line slope between the point of 15% and 95% of the decomposition kinetics at a temperature T (i.e. 140)° C.

The results are given in the following Table 5b.

TABLE 5b

| Entry | 140° C. t95 [s] | 140° C. a [% wt/s] |
|---|---|---|
| 1 | 1250 | 0.026 |
| 2 | 1200 | 0.026 |
| 3 | 1690 | 0.024 |
| 4 | 1105 | 0.030 |
| 5 | 1070 | 0.030 |

All the sodium bicarbonate products comprising a functionalizing agent show increased gas release times at temperatures of 140° C. compared to the reference SOLVAY BICAR® TEC 0/13.

The invention claimed is:

1. A process for preparing a formulation for foaming plastics, the formulation consisting of an alkali metal salt, a functionalizing agent, and optionally water, wherein the alkali metal salt is selected from the group consisting of alkali metal bicarbonate salts, alkali metal sesquicarbonate salts and combinations thereof, wherein said process comprises:
    (a) dissolving the functionalizing agent in water to obtain a solution, the solution consisting of water and the functionalizing agent in an amount of at least 20 g per 100 g water;
    (b) mixing the alkali metal salt with the solution in a weight ratio so that a paste-like composition consisting of the alkali metal salt, the functionalizing agent and water, is formed;
    (c) extruding the paste-like composition to obtain a powder, filaments or granules consisting of water, the alkali metal salt and the functionalizing agent, wherein the alkali metal salt is present in the paste-like composition in an amount of at least 75% by weight; and
    (d) at least partially removing the water from the powder, filaments or granules to obtain a powder, filaments or granules consisting of the alkali metal salt, the functionalizing agent, and optionally water,
    wherein the functionalizing agent is a polymer selected from the group consisting of polyvinylalcohol (PVOH), a polyglycol, polyethylene glycol (PEG), a polysaccharide, polyacrylic acid (PAA), poly(acrylic acid-co-maleic acid), polyethylenimine, polyvinylpyrrolidone (PVP), N-(2-Hydroxypropyl) methacrylamide (HPMA), poly-galactomannane, and combinations thereof.

2. The process of claim 1, wherein the polymer is a polysaccharide selected from the group consisting of hydrolyzed starch, carboxymethylcellulose (CMC), arabic gum, carrageenan, guar gum, locust bean gum, xanthan gum, and combinations thereof.

3. The process according to claim 1, wherein the functionalizing agent is PVOH, wherein the solution at step a) consists of 20 to 40 g of PVOH per 100 g of water, and wherein the mixing of the alkali metal salt with the solution of PVOH at step b) is at a weight ratio of at least 1/1 to at most 3/1 of alkali metal salt to the solution.

4. The process according to claim 1, wherein the filaments or granules are further milled.

5. A process for preparing a formulation for foaming plastics, the formulation consisting of an alkali metal salt a functionalizing agent, and optionally water, wherein the alkali metal salt is selected from the group consisting of alkali metal bicarbonate salts, alkali metal sesquicarbonate salts and combinations thereof, wherein said process comprises:
    (a) dissolving the functionalizing agent in water to obtain a solution comprising the functionalizing agent in an amount of 20 to 40 g per 100 g water;
    (b) mixing the alkali metal salt with the solution comprising the functionalizing agent in a weight ratio of at least 1/1 to at most 3/1 of alkali metal salt to the solution comprising the functionalizing agent so that a paste-like composition comprising the alkali metal salt and the functionalizing agent is formed;
    (c) extruding the paste-like composition to obtain a powder, filaments or granules comprising water, the alkali metal salt and the functionalizing agent, wherein the alkali metal salt is present in the paste-like composition undergoing extrusion in an amount of at least 75% by weight; and
    (d) at least partially removing the water from the powder, filaments or granules to obtain a powder, filaments or granules comprising the alkali metal salt and the functionalizing agent,
    wherein the functionalizing agent is polyvinylalcohol (PVOH).

6. A process for preparing a formulation for foaming plastics, the formulation comprising sodium bicarbonate, a functionalizing agent, and optionally water, wherein the functionalizing agent increases the $CO_2$ release beginning temperature and/or the $CO_2$ release maximum temperature of the sodium bicarbonate when used for foaming plastics, and wherein said process comprises:
    (a) dissolving the functionalizing agent in water to obtain a solution comprising the functionalizing agent in an amount of at least 20 g per 100 g water;
    (b) mixing the sodium bicarbonate with the solution comprising the functionalizing agent in a weight ratio so that a paste-like composition comprising the sodium bicarbonate and the functionalizing agent is formed;
    (c) extruding the paste-like composition to obtain a powder, filaments or granules comprising water, the sodium bicarbonate and the functionalizing agent, wherein the sodium bicarbonate is present in the paste-like composition undergoing extrusion in an amount of at least 75% by weight; and
    (d) at least partially removing the water from the powder, filaments or granules to obtain a powder, filaments or granules comprising the sodium bicarbonate and the functionalizing agent,
    wherein the functionalizing agent is polyvinylalcohol (PVOH), wherein the solution at step a) comprises 20 to 40 g of PVOH per 100 g of water, and wherein the mixing of the alkali metal salt with the solution of PVOH at step b) is at a weight ratio of at least 1/1 to at most 3/1 of alkali metal salt to the solution.

* * * * *